US010293737B2

(12) United States Patent
Granell Peniche et al.

(10) Patent No.: US 10,293,737 B2
(45) Date of Patent: May 21, 2019

(54) MODULAR TRUNK SYSTEM

(71) Applicant: Ford Global Technologies, LLC, Dearborn, MI (US)

(72) Inventors: Enrique Granell Peniche, Naucalpan (MX); Oscar Rovira Vilchis, Lomas de Bellavista (MX); Maria Fernanda Pulido Plauchud, Toluca (MX); Pablo Zetina Gargollo, Naucalpan (MX); Saulo Ratzel Sanchez Huipio, Gustavo A. Madero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 15/171,241

(22) Filed: Jun. 2, 2016

(65) Prior Publication Data
US 2017/0349077 A1    Dec. 7, 2017

(51) Int. Cl.
*B60P 3/06* (2006.01)
*B60R 5/04* (2006.01)
*B60R 7/02* (2006.01)
*B62B 3/02* (2006.01)
*B62B 5/00* (2006.01)

(52) U.S. Cl.
CPC ............. *B60P 3/06* (2013.01); *B60R 5/04* (2013.01); *B60R 7/02* (2013.01); *B62B 3/025* (2013.01); *B62B 3/027* (2013.01); *B62B 5/0003* (2013.01)

(58) Field of Classification Search
CPC ............. B60P 3/06; B60R 5/04; B60R 7/02
USPC .............................................. 296/37.1, 37.14
See application file for complete search history.

(56) References Cited

U.S. PATENT DOCUMENTS

| | | | | |
|---|---|---|---|---|
| 2,094,401 | A | * | 9/1937 | Girl .......................... B60R 5/04 224/42.32 |
| 5,056,846 | A | * | 10/1991 | Tanaka ...................... B60R 5/04 292/83 |
| 6,338,518 | B1 | | 1/2002 | D'Annunzio et al. |
| 6,926,348 | B2 | * | 8/2005 | Krueger .................... B60R 5/04 224/403 |
| 8,602,467 | B2 | | 12/2013 | Lee et al. |
| 9,440,594 | B1 | * | 9/2016 | Clamont Bello ......... B60R 5/04 |
| 2005/0179269 | A1 | | 8/2005 | Weiland |

FOREIGN PATENT DOCUMENTS

| | | |
|---|---|---|
| CA | 2715762 A1 | 3/2012 |
| DE | 19956743 A1 | 5/2001 |

* cited by examiner

*Primary Examiner* — Joseph D. Pape
(74) *Attorney, Agent, or Firm* — Vichit Chea; Brooks Kushman, P.C.

(57) ABSTRACT

A vehicle trunk storage system may include a vehicle trunk having a trunk floor defining an opening and a lip extending around the opening, and a cart including a compartment and a wheeled base, wherein the lip is configured to receive a bottom of the compartment of the cart within the trunk.

10 Claims, 4 Drawing Sheets

MODULAR TRUNK SYSTEM

TECHNICAL FIELD

This disclosure relates to modular trunk systems.

BACKGROUND

Drivers often store items recently purchased within a trunk of their vehicle. Carrying around purchases, including shopping and supermarket bags, can be exhausting and can present a challenge for elderly and disabled people. Often times, several trips to the vehicle are needed to fully load and unload the purchases. To avoid making multiple trips, drivers may use carts or wagons to carry purchases to and from the vehicle. However, such carts and wagons may be difficult to load and unload into the vehicle.

SUMMARY

A vehicle trunk storage system may include a vehicle trunk having a trunk floor defining an opening and a lip extending around the opening, and a cart including a compartment and a wheeled base, wherein the lip is configured to receive a bottom of the compartment of the cart within the trunk.

A removable vehicle trunk cart may include a compartment having a top and bottom, and a pair of extendable legs extending from the bottom of the compartment and connecting the compartment to a wheeled base, the legs configured to lower the base in an extended state and retract the base in a collapsed state.

A vehicle trunk storage system may include a vehicle trunk having a trunk floor defining an opening and a lip extending around the opening; and a cart including a compartment and a wheeled base, wherein the lip is configured to receive a bottom of the compartment of the cart within the trunk, wherein the cart includes a pair of extendable legs extending from the bottom of the compartment and connecting the compartment to the wheeled base.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Oftentimes, loading and unloading items from a vehicle can be time consuming and exhausting for a user. To avoid making multiple trips between a vehicle and a destination (e.g., the user's home, the grocery store, etc.), users may make use of carts or wagons. However, when the loading or unloading is complete, the user may then be required to return the cart, or fold the cart and lift the cart itself into the vehicle. This may cause an inconvenience to the user and may not be physically possible for some users. Further, the folded cart may take up valuable space within the vehicle trunk, and loading it after the purchased items have been loaded into the trunk may damage the items.

Described herein is a modular trunk system for a vehicle trunk whereby at least one cart is arranged within the trunk of the vehicle. The cart may be removed from the trunk without requiring the user to lift the cart into the trunk. Instead, retractable wheels may be arranged so that the cart may be pushed directly into the trunk. The cart may similarly be pulled from the trunk, without requiring the user to unload the items within the cart, or to lift any portion of the cart.

Figure 1:
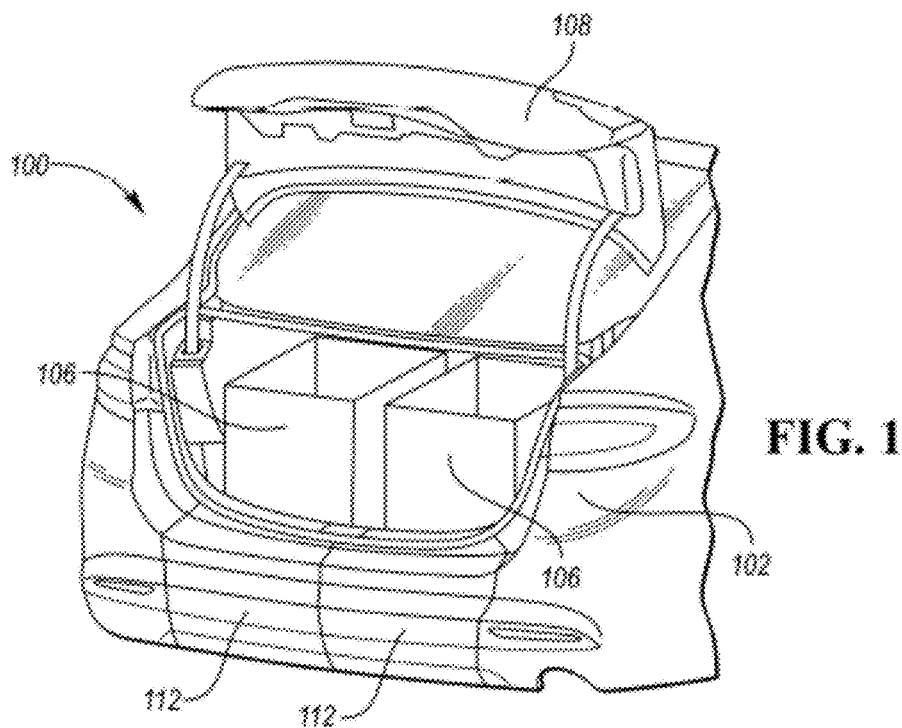
FIG. 1 illustrates an example modular trunk system.

FIG. 1 illustrates an example modular trunk system 100. The system 100 may include a vehicle trunk 102 and at least one cart 106 configured to be arranged therein. In the example shown in FIG. 1, a pair of carts 106 is shown. However, one or more carts, including three carts 106, could be arranged within the vehicle trunk 102. The vehicle trunk 102 may be accessible via a trunk door 108, as well as via a pair of bumper doors 112. The bumper doors 112 are described in more detail with respect to FIG. 3 below.

The cart 106 may be arranged within the vehicle trunk 102 such that the trunk door 108 may completely close when the cart 106 is arranged in the trunk 102. The cart 106 may be configured to carry any number of items such as groceries, sporting equipment, trash, luggage, etc.

Figure 2:
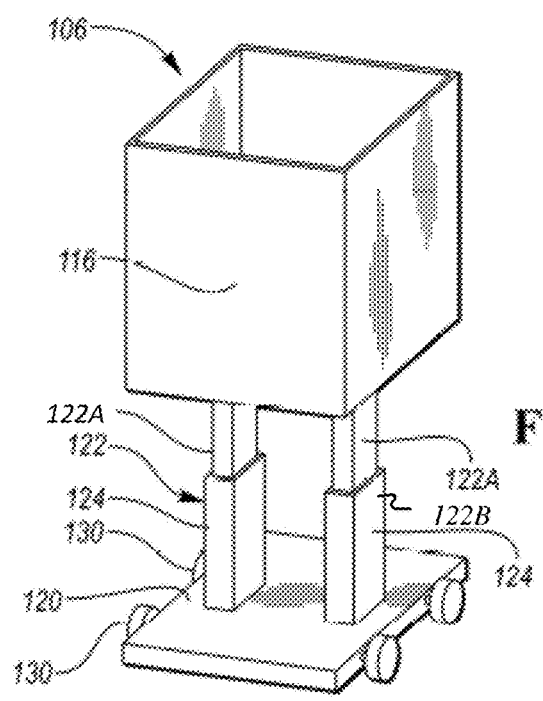
FIG. 2 illustrates an example cart for the modular trunk system.

FIG. 2 illustrates the example cart 106 for the modular trunk system 100. The cart 106 may include at least one compartment 116 configured to carry the various items. The compartment 116, as shown by way of example in the figures, may include an open top to allow items to be placed within the compartment 116. In another example, a portion of a side of the compartment 116 may be open. Furthermore, although not shown, the compartment 116 may include a lid configured to open to allow access to the storage area therein. The lid may close while the cart 106 is traveling within the trunk 102.

While the compartment 116 is shown as forming a cubic shape in the figures, other shapes and dimensions may be used to form the compartment 116. The compartment 116 may be dimensioned to fit within the vehicle trunk 102 and such dimensions may be specific to the vehicle make and model. The compartment 116 may be made of a plastic or polymer material allow for stability and rigidity while permitting the cart 106 to remain relatively lightweight.

A pair of legs 122 may extend from a bottom of the compartment 116 to connect the compartment 116 to a base 120. The base 120 may be arranged under the compartment 116 and may have dimensions similar to the length and width of the compartment 116. Two pairs of wheels 130 may be arranged on the base allowing the cart 106 to be easily movable in an extended state.

The legs 122 may include a first portion 122A and a second portion 122B configured to fit within the first portion 122A. In the extended state, as shown in FIG. 2, the second portion 122B may be extended out of the first portion 122A. In a collapsed state, the second portion 122B may be arranged within the first portion 122A. This is described in more detail below with respect to FIGS. 3 and 4. Although two portions 122A, 122B are shown, multiple portions may be used to create a telescoping effect for collapsing and expanding the legs 122. The legs 122 may include a locking mechanism such as a pin lock 124 configured to lock the legs 122 in a fixed position by preventing movement of the first portion 122A and the second portion 122B.

By allowing the legs 122 to be extendable and collapsible, the base 120 may be moveable with respect to the compartment 116. In the collapsed state, the cart 106 may be arranged within the vehicle trunk 102. In the expanded state, where the base has been lowered away from the compartment 116, the cart 106 may be removed from the trunk 102 to be used during shopping, etc.

Figure 3:
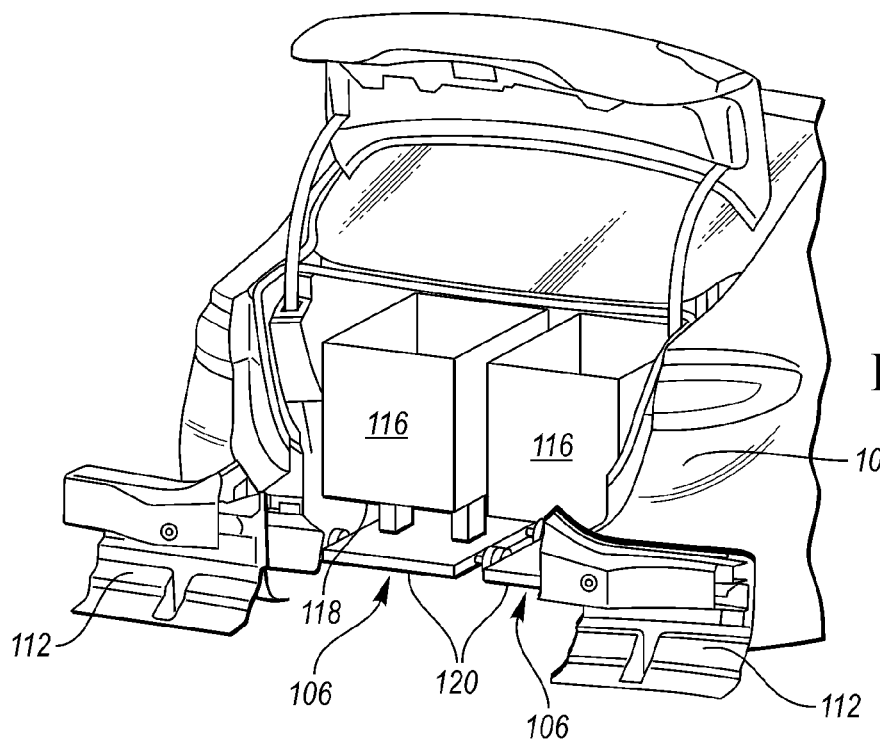
FIG. 3 illustrates the modular trunk system in a first state.

FIG. 3 illustrates the modular trunk system in a first state where the bumper doors 112 and the trunk door 108 are open. The bumper doors 112 may be hinged at each exterior side thereof allowing the doors 112 to open in the center of the bumper. In the first state, or the stored or collapsed state, the cart 106 is arranged within the vehicle trunk 102. A bottom 118 of the compartment 116 of the cart 106 may form part of a floor of the trunk 102. That is, the bottom 118 separates the trunk 102 from the exterior road surface. The base 120 may be suspended just below the bottom 118 of the compartment 116 when the cart is stored within the trunk 102.

Figure 4:
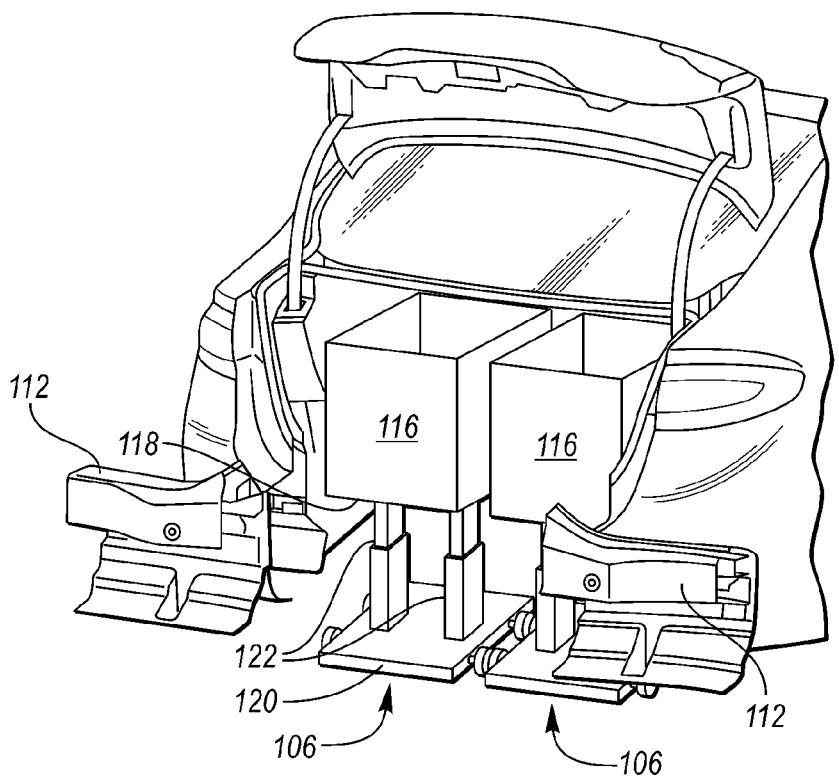
FIG. 4 illustrates the modular trunk system in a second state.

FIG. 4 illustrates the modular trunk system 100 in a second state where the cart 106 is in an extended state. In the extended state, as explained above with respect to FIG. 2, the legs 122 of the cart 106 may be extended so that the base 120 may be lowered. In the example described herein, the legs 122 may be extended by removing the locking mechanism 124 and allowing the first portion 122A to slide out of the second portion 122B. The locking mechanism 124 may then be returned to prevent the legs 122 from collapsing during use. Once the base is fully lowered, the wheels 130 on the base 120 may come into contact with the ground.

Figure 5:
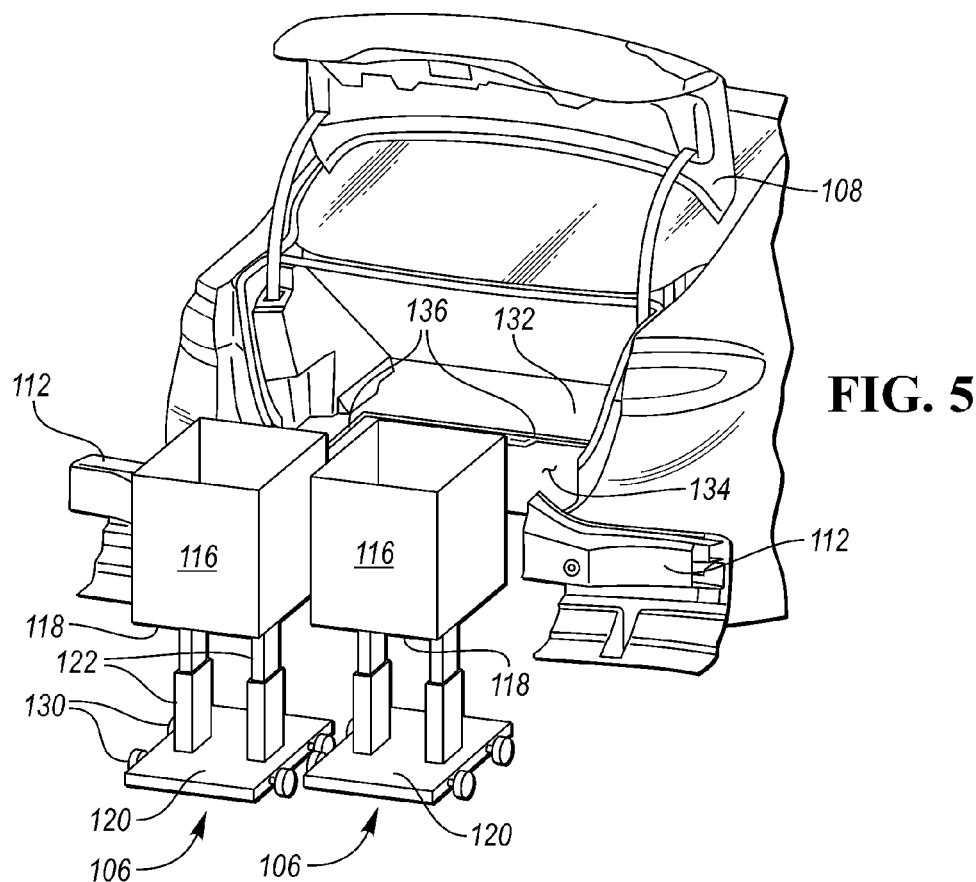
FIG. 5 illustrates the modular trunk system in a third state.

FIG. 5 illustrates the modular trunk system 100 in a third state where the cart 106 is in a removable extended state to be removed from the vehicle trunk 102 and configured to be used for shopping, etc. That is, once the legs 122 of the cart 106 have been extended and the base 120 lowered to the ground, the user may pull the cart 106 out of the trunk without lifting, or otherwise manipulating, the cart. Due to the bumper doors 112 opening at the center of the bumper, the cart 106 may be easily slid from the trunk 102. Additionally, the cart 106 may be easily returned to the trunk 102, by reversing the removal steps. Although not shown, the bumper doors 112 may include an internal multiple bolt locking mechanism configured to keep the doors 112 locked in place to keep the bumper functional during vehicle use. The bolt locking mechanism may hold the bumper together and maintain its functionality.

The trunk 102 may include a trunk floor 132 defining an opening 134 configured to receive the cart 106. A lip 136 may be defined around the periphery of the opening 134. As shown in FIGS. 3 and 4, the lip 136 may be configured to receive a portion of the perimeter of the bottom 118 of the compartment 116 when the system 100 is in the first and second states as shown in FIGS. 3 and 4. That is, the compartment 116 may rest on the lip 136 during the first and second states. The compartment 116 may fit securely within the trunk 102 so as to inhibit movement during vehicle use.

Although not shown, various locking mechanisms may be implemented to further prevent the cart 106 from shifting during vehicle use. This is described in further detail with respect to FIG. 7 below. During the third state, the compartment 116 may be slid from the lip 136.

The user may return the cart 106 to the vehicle trunk 102 after use by opening the bumper doors 112 and pushing the cart into the opening 134. The bottom 118 of the compartment 116 may rest on the lip 136. Once the cart 106 is arranged within the opening 134, the user may remove the locking mechanism 124 from the legs 122 and push the base 120 upwards. Once the legs 122 are fully collapsed, the user may return the locking mechanism 124 to keep the legs 122 collapsed. Thus, the legs 122 may be collapsed while the cart 106 rests on the lip 136, preventing any lifting of the cart and items therein by the user.

Figure 6:
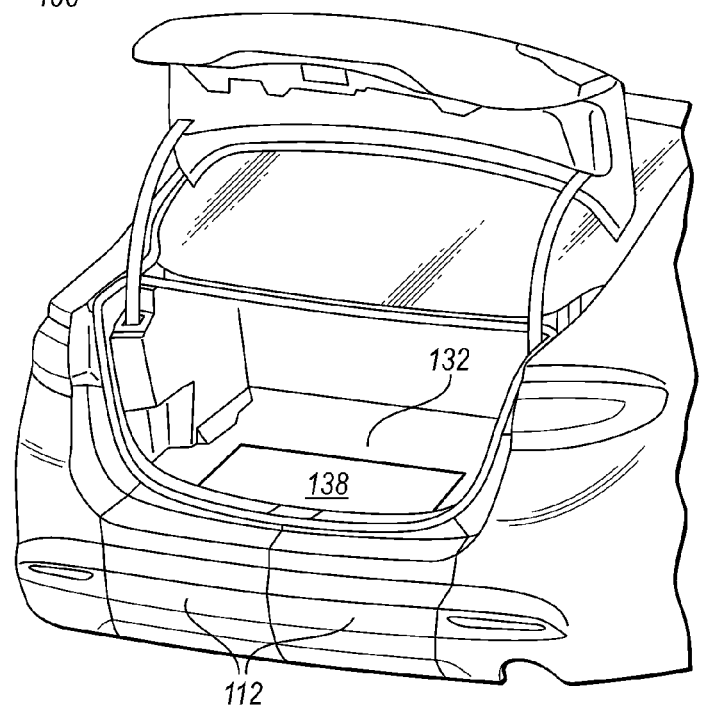
FIG. 6 illustrates a trunk of the modular trunk system.

FIG. 6 illustrates the trunk 102 of the modular trunk system 100. The trunk floor 132 may include a floor door 138 configured to cover the opening 134 when the cart 106 has been removed from the trunk 102. The door 138 may be similar to a sun roof closure where the door 138 may slide along the lip 136 and cover the opening 134. The door 138 may be motor driven, as well as manually slidable. The door 138 may rest on the lip 136 and prevent dirt, water, animals, etc., from entering the trunk 102 while the cart 106 is not stored within the trunk 102.

Figure 7:
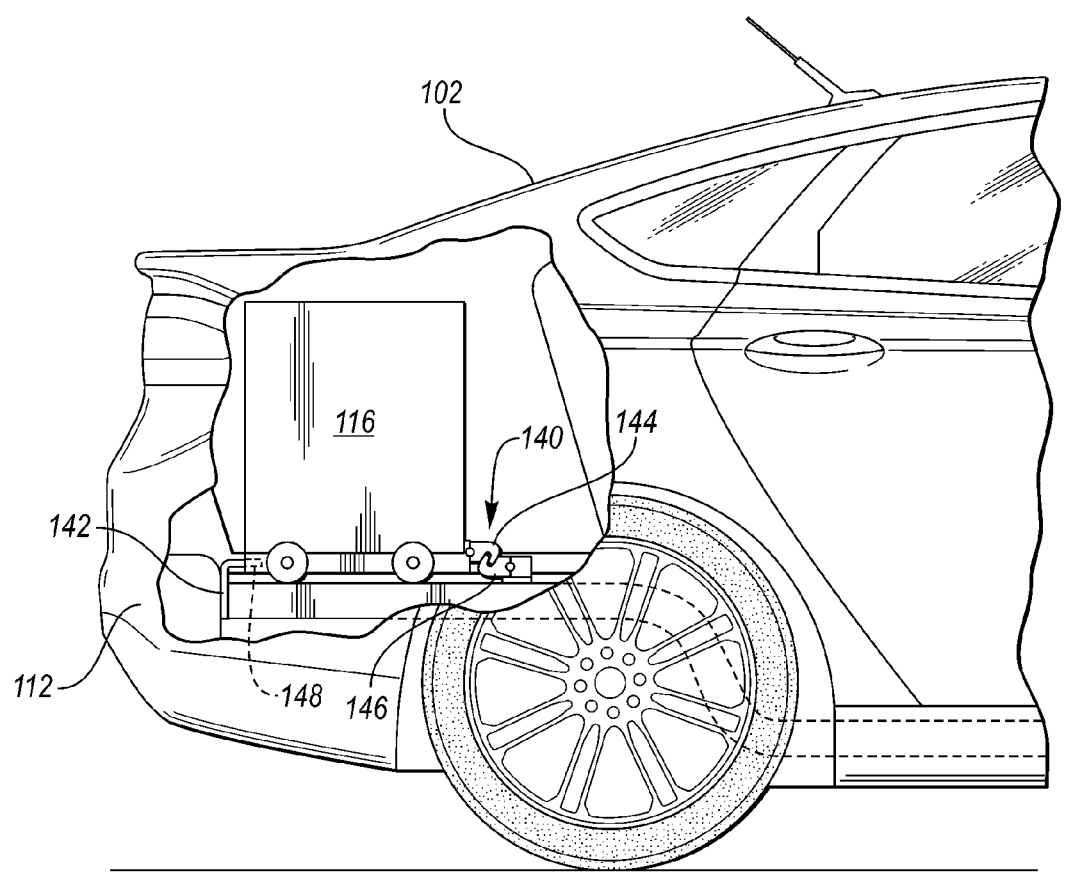
FIG. 7 illustrates a cross sectional side view of the modular trunk system showing a set of locking mechanisms.

FIG. 7 illustrates a cross sectional side view of the vehicle trunk 102 showing a set of locking mechanisms 140, 142. The first locking mechanism 140 may include a releasable latch mechanism 146 similar to a hook with a spring-loaded closable latch, configured to attach with an eye 144 arranged on a rear of the cart 106. The latch mechanism 146 may connect and attach with the eye 144 upon force being applied thereto. That is, when the cart 106 is pushed into the trunk 102, the eye 144 may apply pressure to the closable latch of the latch mechanism and open the latch so that the latch mechanism may attach with the eye 144. The latch mechanism 146 may release the eye 146 upon the cart 106 being pulled away from the latch mechanism 146 with a certain amount of force. That is, while the latch mechanism 146 may engage with the eye 144 to prevent the cart 106 from shifting significantly during transport, the latch mechanism 146 may release upon realizing a certain amount of force. The latch mechanism 146 may be manually released as well by the user manually unlatching the latch mechanism 146 from the eye 144.

The second locking mechanism 142 may be arranged on an inside fascia of the bumper 112. The second locking mechanism 142 may be configured to abut the cart 106 when the bumper 112 is in a closed position in order to maintain the cart 106 in a fixed position within the trunk. The second locking mechanism 142 may include a hook and closable latch system similar to the one described above with respect to the first locking mechanism 140. Additionally or alternatively, the second locking mechanism 142 may include a projection 148 configured to be received by a recess defined by the cart 106 (not separately labeled).

Accordingly, a modular trunk system may be configured to allow a cart to be easily stored and removed from a vehicle trunk without requiring any lifting or folding by the user. Objects within the compartment of the cart may remain therein without the need to load and unload the items from the trunk, creating efficient and easy transport of the items between stores, homes, etc. Furthermore, the base of the cart may form the bottom of the vehicle trunk. The cart may include a pair of expandable legs, allowing the cart to be easily adaptable to fit within the trunk and to be used outside of the vehicle, all while allowing the cart to easily slide back into place in the trunk after use.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle trunk storage system, comprising:
   a vehicle trunk having a trunk floor defining an opening and a lip extending around the opening; and
   a cart including a compartment and a wheeled base, wherein the lip is configured to receive a bottom of the compartment of the cart within the trunk, wherein the cart includes a pair of extendable legs extending from the bottom of the compartment and connecting the compartment to the wheeled base, the legs configured to lower the base in an extended state and retract the base in a collapsed state.

2. The system of claim 1, wherein the legs include a first portion and a second portion configured to fit within the first portion.

3. The system of claim 1, further comprising a pair of bumper doors configured to open to the vehicle trunk, wherein the cart, in an extended state, is configured to be removed from the trunk through the bumper doors.

4. The system of claim 3, further comprising a floor door configured to cover the opening of the trunk floor, wherein the floor door completes the trunk floor when the cart is in the extended state and external to the vehicle and wherein the bottom of the compartment of the cart completes the trunk floor when the cart is in a collapsed state within the vehicle trunk.

5. The system of claim 1, wherein the wheeled based includes a pair of wheels.

6. The system of claim 1, wherein the cart includes a pair of carts.

7. A vehicle trunk storage system, comprising:
   a vehicle trunk having a trunk floor defining an opening and a lip extending around the opening; and
   a cart including a compartment and a wheeled base, wherein the lip is configured to receive a bottom of the compartment of the cart within the trunk, wherein the cart includes a pair of extendable legs extending from the bottom of the compartment and connecting the compartment to the wheeled base.

8. The system of claim 7, wherein the legs include a first portion and a second portion configured to fit within the first portion and wherein the legs are configured to lower the base in an extended state and retract the base in a collapsed state.

9. The system of claim 7, further comprising a pair of bumper doors configured to open to the vehicle trunk, wherein the cart, in an extended state, is configured to be removed from the trunk through the bumper doors.

10. The system of claim 9, further comprising a floor door configured to cover the opening of the trunk floor, wherein the floor door completes the trunk floor when the cart is in the extended state and external to the vehicle and wherein the bottom of the compartment of the cart completes the trunk floor when the cart is in a collapsed state within the vehicle trunk.

* * * * *